United States Patent [19]

Nakamura et al.

[11] Patent Number: 5,138,356
[45] Date of Patent: Aug. 11, 1992

[54] AUTOMATIC FOCUS ADJUSTING APPARATUS OF A CAMERA

[75] Inventors: Kimihiko Nakamura, Nara; Yoshinori Ueyama, Wakayama; Masataka Hamada, Osakasayama; Kenji Ishibashi, Sakai, all of Japan

[73] Assignee: Minolta Camera Kabushiki Kaisha, Osaka, Japan

[21] Appl. No.: 647,060

[22] Filed: Jan. 29, 1991

[30] Foreign Application Priority Data

Jan. 31, 1990 [JP] Japan .................................. 2-22851
Jan. 31, 1990 [JP] Japan .................................. 2-22852

[51] Int. Cl.⁵ .......................... G03B 13/36; G02B 7/28
[52] U.S. Cl. .................................... 354/402; 250/201.8
[58] Field of Search ............... 354/402, 403, 406, 407, 354/408; 250/201.2, 201.8

[56] References Cited

FOREIGN PATENT DOCUMENTS 60-214325 10/1985 Japan .
1-107224 4/1989 Japan .
1-134410 5/1989 Japan .
1-177507 7/1989 Japan .

*Primary Examiner*—W. B. Perkey
*Attorney, Agent, or Firm*—Burns, Doane, Swecker & Mathis

[57] ABSTRACT

An automatic focus adjusting apparatus of a camera calculates amount of defocus of an object, and repeatedly calculates the speed of the image plane of the object based on the amount of defocus. When releasing operation of the camera is started, image plane speed of the object at the time of exposure is estimated by using a secondary curve based on the speed of the image plane, and the lens is driven based on the data thereof. Since the image plane speed of the object is estimated by using the secondary curve equation, correction of the amount of defocus can be accurately done regardless of the speed of movement of the object.

3 Claims, 10 Drawing Sheets

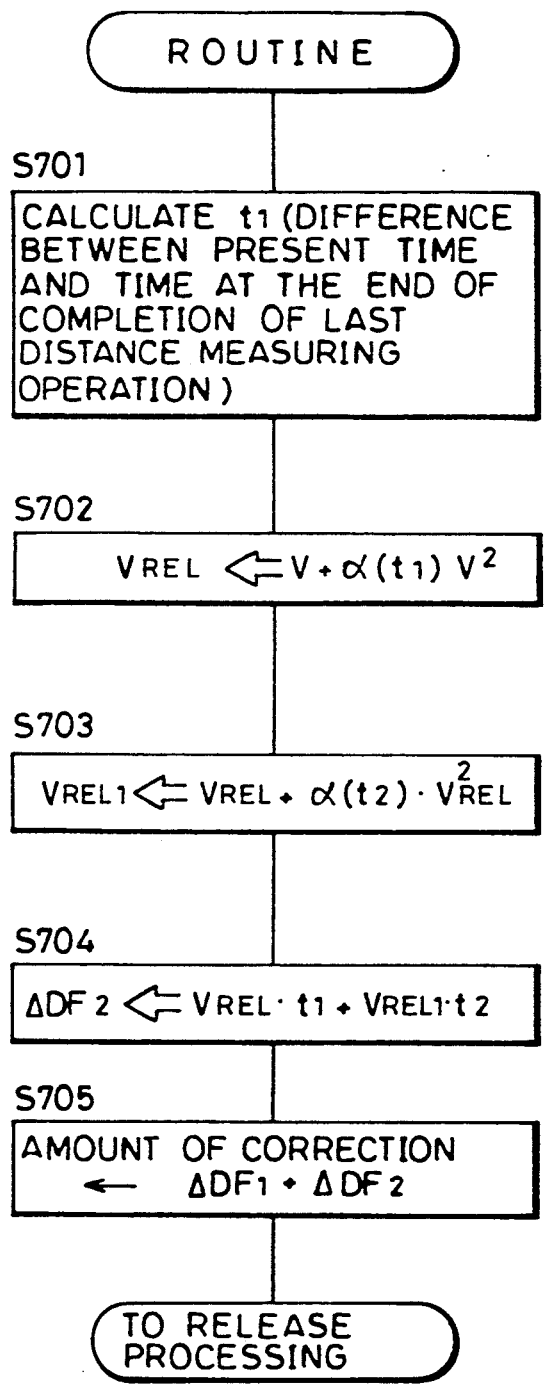

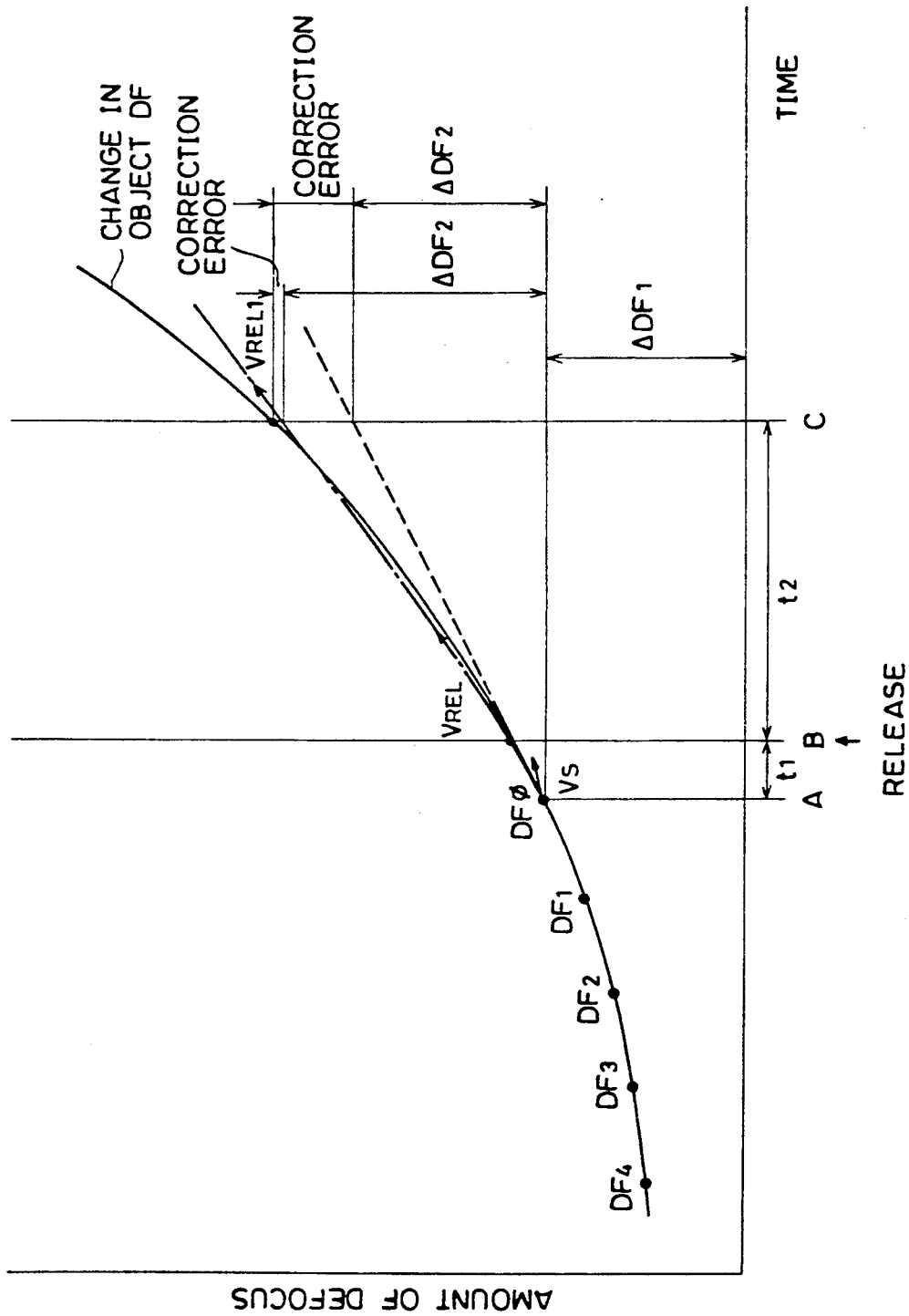

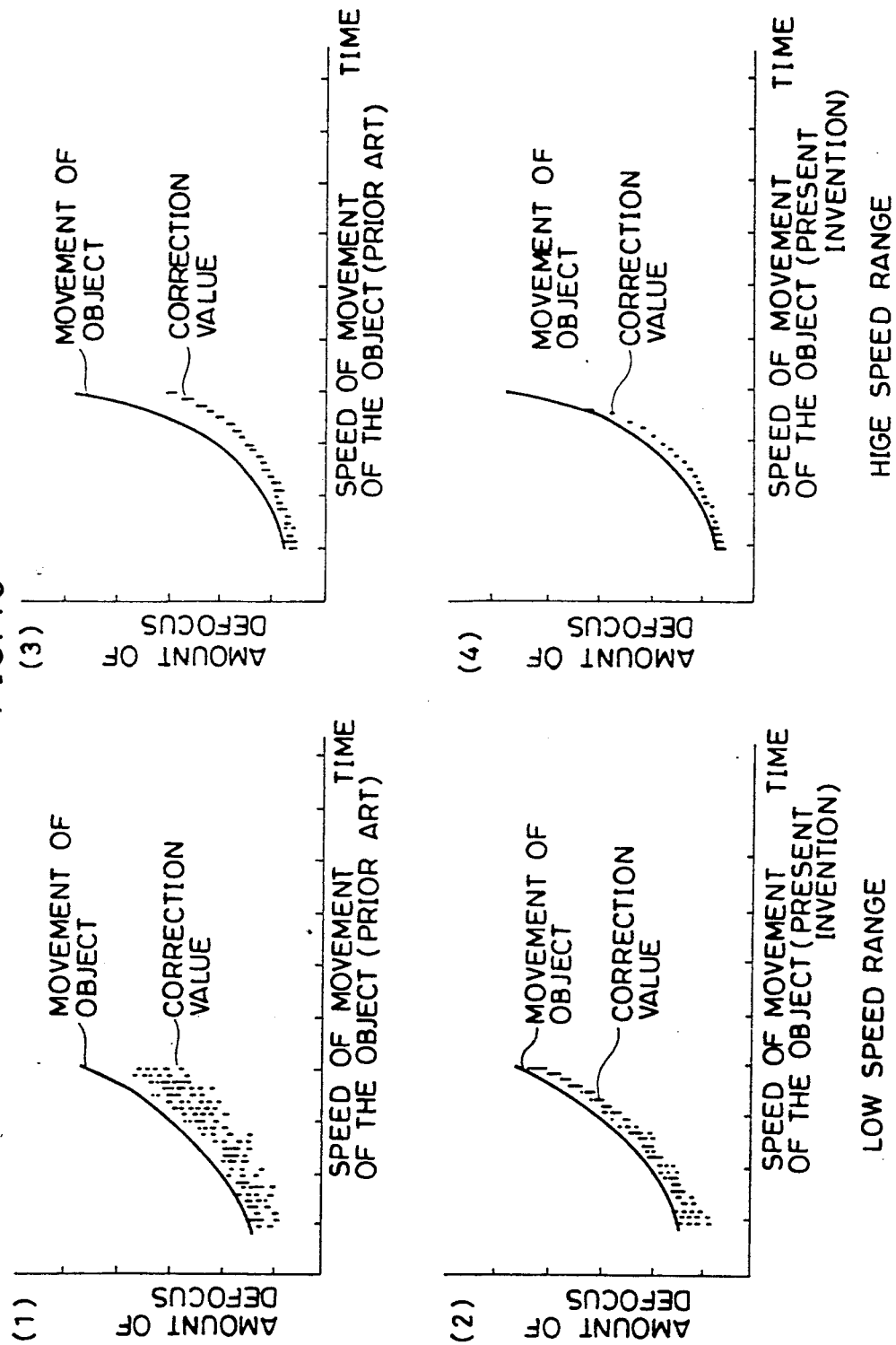

AUTOMATIC FOCUS ADJUSTING APPARATUS OF A CAMERA

BACKGROUND OF THE INVENTION

1. Field of the Invention

The present invention relates to an automatic focus adjusting apparatus of a camera, and more specifically to an automatic focus adjusting apparatus of a camera in which the camera can be brought into the in-focus state more accurately.

2. Description of the Related Art

Cameras having automatic focus adjusting apparatuses have been available. In a conventional camera having automatic focus adjusting apparatus, if an object is moving, next position of the image plane is estimated in accordance with a function based on amount of defocus in the past, amount of lens drive and amount of defocus at present, and lens is driven to realize in-focus state at the point.

In the conventional camera having the automatic focus adjusting apparatus, correction of the amount of defocus with the object moving has been done by using a linear function. If the speed of movement of the object is slow, well-focused photograph can be taken even if the amount of defocus is corrected by the linear function. However, if the object moves fast, the camera cannot follow the amount of defocus, and accurate correction is impossible.

Now, if the position of image plane of a moving object is to be estimated, the speed of the object must be calculated at first. Conventionally, the speed of the object was calculated by taking a mean value of the speed detected a plurality of times.

However, the speed of the object may change every moment. Accordingly, mean value with weight added to newly detected values provides more accurate information than the simple mean value as calculated in the prior art. However, it takes much time to calculate weighted mean. Consequently, if the object moves fast, there will be a large error due to the delay in calculation.

SUMMARY OF THE INVENTION

Therefore, an object of the present invention is to more accurately correct the amount of defocus regardless of the speed of movement of an object in an automatic focus adjusting apparatus of a camera.

Another object of the present invention is to estimate accurately an image plane position in consideration of the speed of the object in the automatic focus adjusting apparatus of a camera.

The above described objects of the present invention can be attained by an automatic focus adjusting apparatus of a camera, including: a defocus amount calculator for calculating the amount of defocus of an object; an image plane speed calculator for repeatedly calculating image plane speed of the object; an image plane speed estimating apparatus for estimating the image plane speed at the time of exposure by using approximation function of higher degree based on the calculated image plane speed; and a lens position calculator for calculating the in-focus position of the lens based on the estimated image plane speed.

The image plane speed calculator repeatedly calculates the image plane speed of the object based on the amount of defocus calculated by the defocus amount calculator. Based on the calculated image plane speed, the image plane speed at the time of exposure is estimated by the image plane speed estimating apparatus, by using an approximation function of high degree. Based on the estimated image plane speed, the in-focus position of the photographing lens is calculated by the lens position calculator. Consequently, the photographing lens 51 is driven to the calculated in-focus position. Therefore, in an automatic focus adjusting apparatus of a camera, more accurate correction of the amount defocus is enabled regardless of the speed of movement of the object.

In accordance with another aspect of the present invention, the automatic focus adjusting apparatus of a camera includes: a focus detector for detecting the in-focus state of the object image; a speed detector for detecting image plane speed of the object; first and second correcting apparatuses for correcting the detected image plane speed; a selector for selecting either the first or the second correcting apparatus corresponding to the image plane speed; and a focus adjusting device for carrying out focus adjustment of a camera lens based on the image plane speed corrected by the selected correcting apparatus and on the in-focus state detected by the focus detector. The image plane speed of the object is detected, and method of correction of the image plane speed is selectively switched corresponding to the speed. Focus adjustment of the lens is done based on the image plane speed provided by the selected method of correction and on the in-focus state of the object image. Consequently, in an automatic focus adjusting apparatus of a camera, image plane position can be accurately estimated in view of the speed of the object.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart showing a release routine;

FIG. 9 is a timing chart describing lens drive during releasing; and

FIG. 10 shows effects of the automatic focus adjusting apparatus in accordance with the present invention.

DESCRIPTION OF THE PREFERRED EMBODIMENTS

The embodiments of the present invention will be specifically described with reference to the drawings. In the following, automatic focus adjustment of a camera will be referred to as AF.

Figure 1:
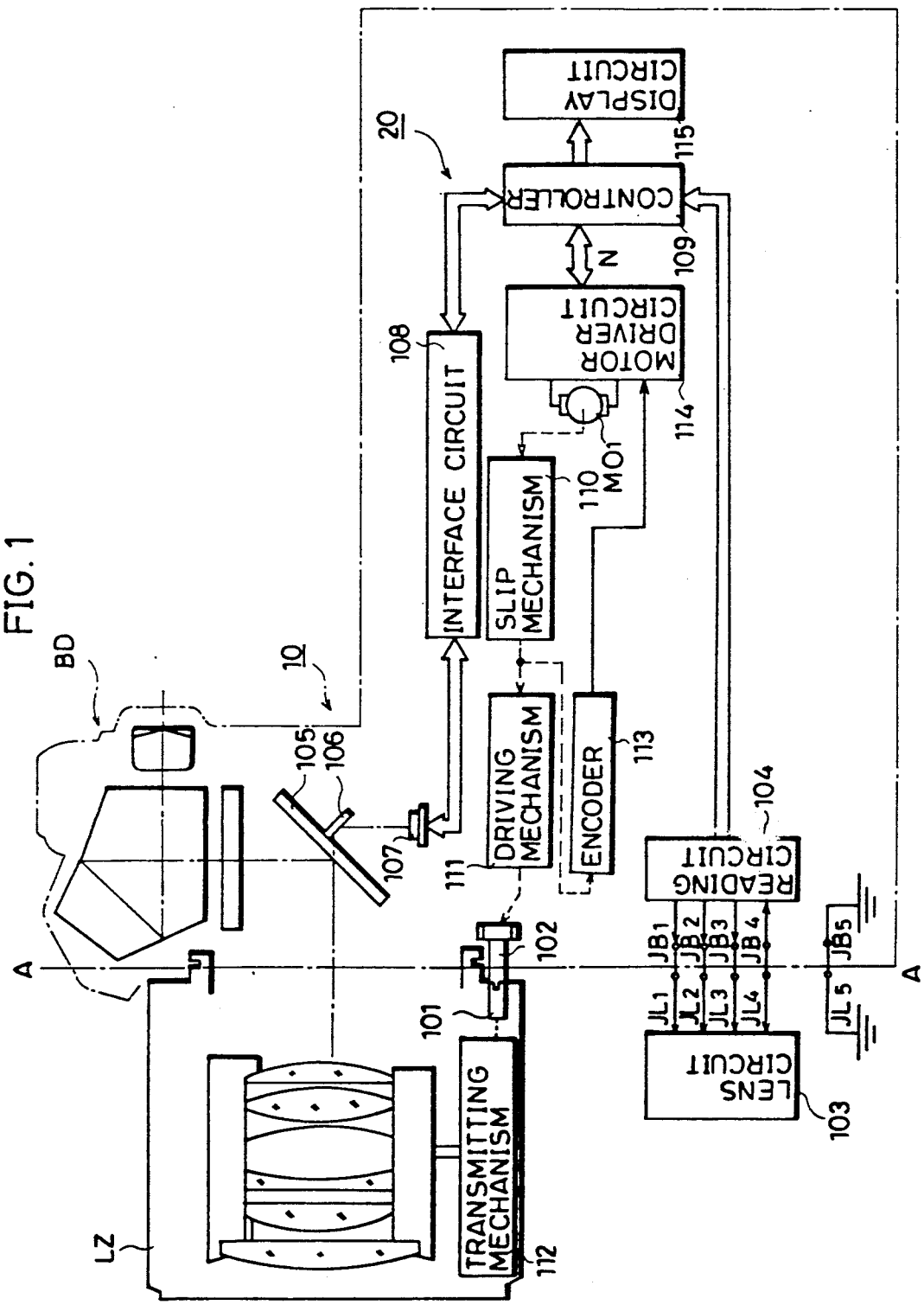
FIG. 1 is a schematic block diagram of a camera to which an automatic focus adjusting apparatus of the present invention is applied.

Fig. 1 is a block diagram showing a schematic structure of a camera. In the figure, the left side of the line A—A' shows an interchangeable lens LZ, and the right side shows the body BD of the camera. They are mechanically coupled by clutches 101 and 102. When the interchangeable lens LZ is mounted on the body BD of the camera by the clutches 101 and 102, a lens circuit 103 of the interchangeable lens LZ is electrically connected to a reading circuit 104 on the camera body by connecting terminals JL1 to J5 and JB1 to JB5

Referring to the right side of FIG. 1, the camera body BD comprises a defocus amount detecting portion 10, a lens driving portion 20 for driving a lens to an in-focus position based on the amount of defocus detected by the defocus amount detecting portion 10, and an interface circuit 108 connecting the defocus amount detecting portion 10 with the lens driving portion 20. The defocus amount detecting portion 10 includes an optical system and a CCD image sensor 107. The lens driving portion 20 includes a controller 109 which is essential for lens driving, a motor driver circuit 114 connected to the controller 109, a slip mechanism 110 connected to the motor driver circuit 114, an encoder 113, a reading circuit 104 for reading signals from the lens circuit 103 connected to the controller, and an indicating circuit 115 for giving various indications.

In the camera system shown in FIG. 1, light reflected from the object which has passed through a lens system in the interchangeable lens LZ passes through a translucent portion at the center of a reflecting mirror 105 of the camera body BD, reflected by a submirror 106, and received by the CCD image sensor 107 in an in-focus detecting module. The CCD image sensor 107 is used as means for measuring distance to the object. A known sensor including a plurality of photoelectric converting elements arranged in an array with signals from res ective photoelectric converting elements taken ou¹ ¹¹c-cessively is used as the CCD image sensor.

The interface circuit 108 drives the CCD image sensor, takes object data from the CCD image sensor 107 and feeds the taken data to the controller 109. The controller 109 calculates the amount of defocus $|\Delta|$ indicating the amount of defocus of the lens from the in-focus position, and direction of defocus indicating whether the lens position is in front of (front focus) or behind (rear focus) the in-focus position, based on the signal from the CCD image sensor 107.

A motor MO1 connected to the motor driver circuit 114 is driven based on these signals, and rotation thereof is transmitted to a transmission mechanism 112 of the interchangeable lens LZ through the slip mechanism 110, the driving mechanism 111 and the clutches 102 and 101. Consequently, the lens system in the interchangeable lens LZ is moved forward and rearward in the direction of the optical axis so as to realize focus adjustment. In order to monitor the amount of movement of the lens system at this time, the encoder 113 is coupled to the driving mechanism 111 of the camera body BD. The encoder 113 outputs pulses, the number of which corresponds to the amount of driving of the lens system.

The slip mechanism 110 is provided for slipping power of the motor MO1 when torque higher than a prescribed level is applied to portions to be moved in the interchangeable lens LZ. Consequently, excessive load is not applied to the motor MO1.

The terminals between the lens circuit 103 and the reading circuit 104 will be described. From the reading circuit 104 of the camera body to the lens circuit 103 of the interchangeable lens, fed are: power supply through the terminals JB1-JL1; clock pulses for synchronization at data transfer through terminals JB2-JL2; and read start signals for starting reading of data through the terminals JB3-JL3. From the lens circuit 103 to the reading circuit 104, serial data are fed through the terminals JL4-JB4. The terminals JB5 and JL5 are common grounding terminals.

When a read start signal is fed to the lens circuit 103, data of the lens circuit 103 are transmitted to the reading circuit 104 in synchronization with the clock pulses. The reading circuit 104 converts the input serial data to parallel data KL to transmit the same to the controller 109 based on the same clock pulse as fed to the lens circuit 103.

The controller 109 carries out calculation of K=KL·KB based on the internal data KB and the data KL from the reading circuit 104. The controller 109 calculates the amount of defocus $|\Delta|$ based on data of the object image from the interface circuit 108, and calculates the number of pulses N to be detected by the encoder 113 by the operation of $K \cdot |\Delta|$. Further, the controller 109 rotates the motor MO1 clockwise or counterclockwise through the motor driver circuit 114 dependent on the signal of the defocus direction derived from the data of the object image. When N pulses, the number equal to the calculated value N, is input from the encoder 113 to the controller 109, it is determined that the lens system for focus adjustment is moved by the amount $\Delta d$ to the in-focus position, and rotation of the motor MO1 is stopped.

When in-focus state is realized by such focus adjustment, a prescribed signal is fed from the controller 109 to the indicating circuit 115, and the state of in-focus and distance to the object are indicated.

Figure 2:
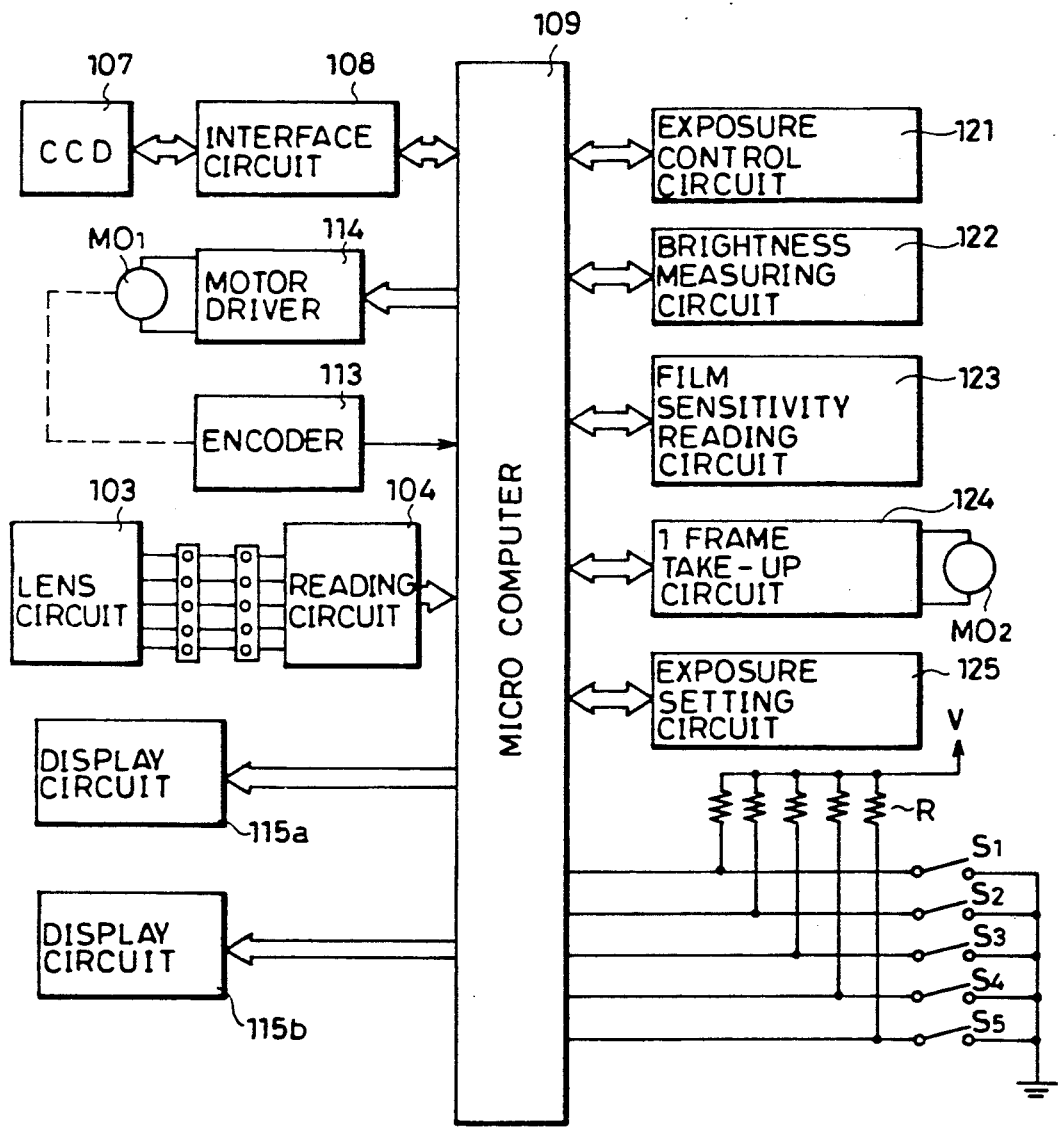
FIG. 2 is a block diagram of a microcomputer and the peripheral portions of the camera to which the automatic focus adjusting apparatus of the present invention is applied.

The foregoing is an outline of camera operation. Referring to FIG. 2, the control operation in the controller 109 will be described in detail. In FIG. 2, the same portions as FIG. 1 are denoted by the same reference characters.

The controller 109 is a microcomputer. To the microcomputer 109 connected is an exposure control circuit 121 which opens and closes shutter corresponding to start and end of exposure, and carries out mirror elevation and aperture control of the reflecting mirror 105 corresponding to a mirror up signal. To the microcomputer 109 also connected is a brightness measuring circuit 122 for transmitting signals corresponding to brightness of the object converted into digital signals to the microcomputer 109. In addition, to the microcomputer 109, connected are a film sensitivity automatic reading circuit 123 for reading sensitivity of the loaded film; a film 1 frame taking up circuit 124 for taking up 1 frame of the film by driving a motor MO2 based on a signal from the microcomputer 109; and an exposure setting circuit 125 for setting shutter speed and aperture value. The film sensitivity read by the film sensitivity automatic reading circuit 123 and the set values of the exposure setting circuit 125 are taken to the microcomputer 109. Further, the CCD image sensor 107 is connected to the microcomputer 109 through the interface circuit 108, as described above. Image information provided by the CCD image sensor 107 is taken to the microcomputer 109. Further, motor driver circuit 114 and so on are connected to the microcomputer 109 as described with reference to the block diagram of FIG. 1.

Switches connected to the microcomputer 109 will be described. The following switches are connected to the microcomputer 109. A switch $S_1$ is turned on by a first stroke of a release button, not shown. When this switch $S_1$ is turned on, the microcomputer 109 is turned on to carry out a process which will be described later in accordance with an AF flow. A switch $S_2$ is turned on by a second stroke of the release button and when the switch $S_2$ is turned on, a process which will be described later with reference to a flow of release routine is executed. A switch $S_3$ is turned on when elevation of a reflection mirror is completed. When a release member, not shown, is charged, the switch $S_3$ is turned off. A switch $S_4$ is a photographing mode selecting switch for selecting a continuous photographing mode and a frame photographing mode. A switch $S_5$ is turned on when exposure is completed, and is turned off, when one frame of the film is taken. The primary sides of the switches $S_1$ to $S_5$ are grounded, and the secondary sides connected to the microcomputer 109 are pulled up to the voltage V through resistances R.

Controlling operation of the camera having such a microcomputer 109 as described above will be described with reference to the flow chart.

Figure 3:
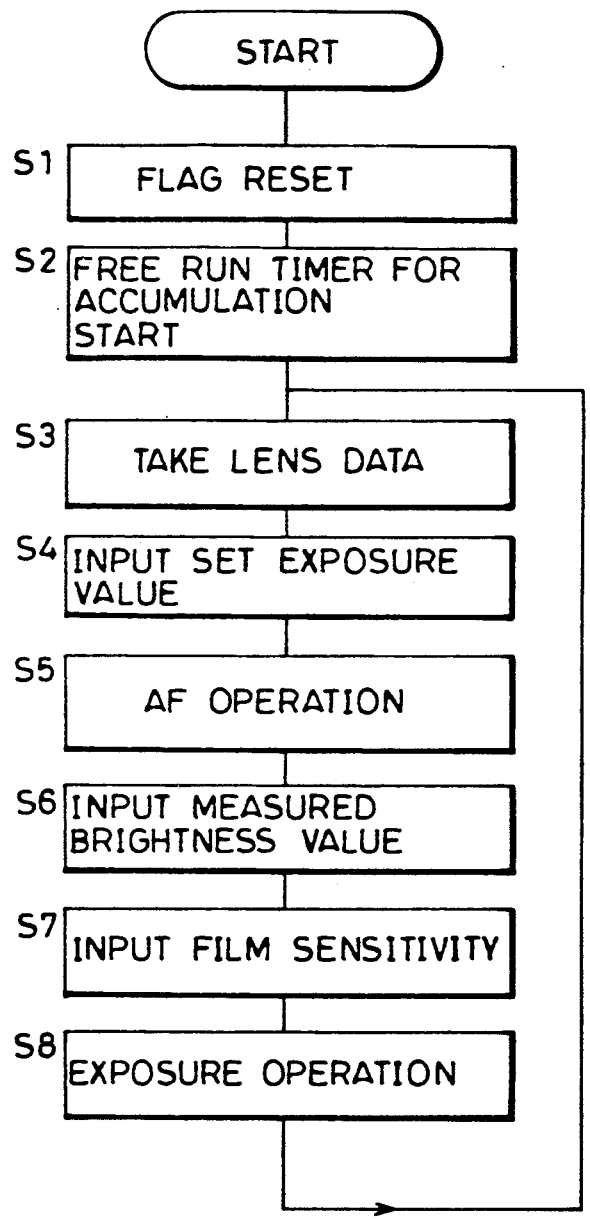
FIG. 3 is a flow chart showing a main flow of the automatic focus adjusting apparatus in accordance with the present invention.

When the switch $S_1$ is turned on by a first stroke of the release, the microcomputer 109 executes the flow shown in FIG. 3.

In step S1, various flags are reset, and in step S2, a free run timer in the microcomputer 109 is started to indicate time for various operations. In step S3, various data such as focal length of the lens necessary for AF, full open aperture value, a conversion coefficient K for calculating amount of forward movement representing amount of movement of the lens in the direction of the optical axis with respect to the number of rotation of lens are taken in the microcomputer 109 from the lens circuit 105 through the reading circuit 104. In the next step S4, set aperture value, shutter speed and the like are taken from the exposure setting circuit 125, and in step S5, an in-focus detecting operation as will be described later and AF operation for driving the lens to the in-focus position based on the result of operation are carried out. In step S6, the result of brightness measurement by the brightness measuring circuit 122 is taken, and in step S7, film sensitivity is taken by the film sensitivity reading circuit 123. In step S8, exposure operation is carried out based on the input data described above, and then the program returns to step S3.

Figure 4:
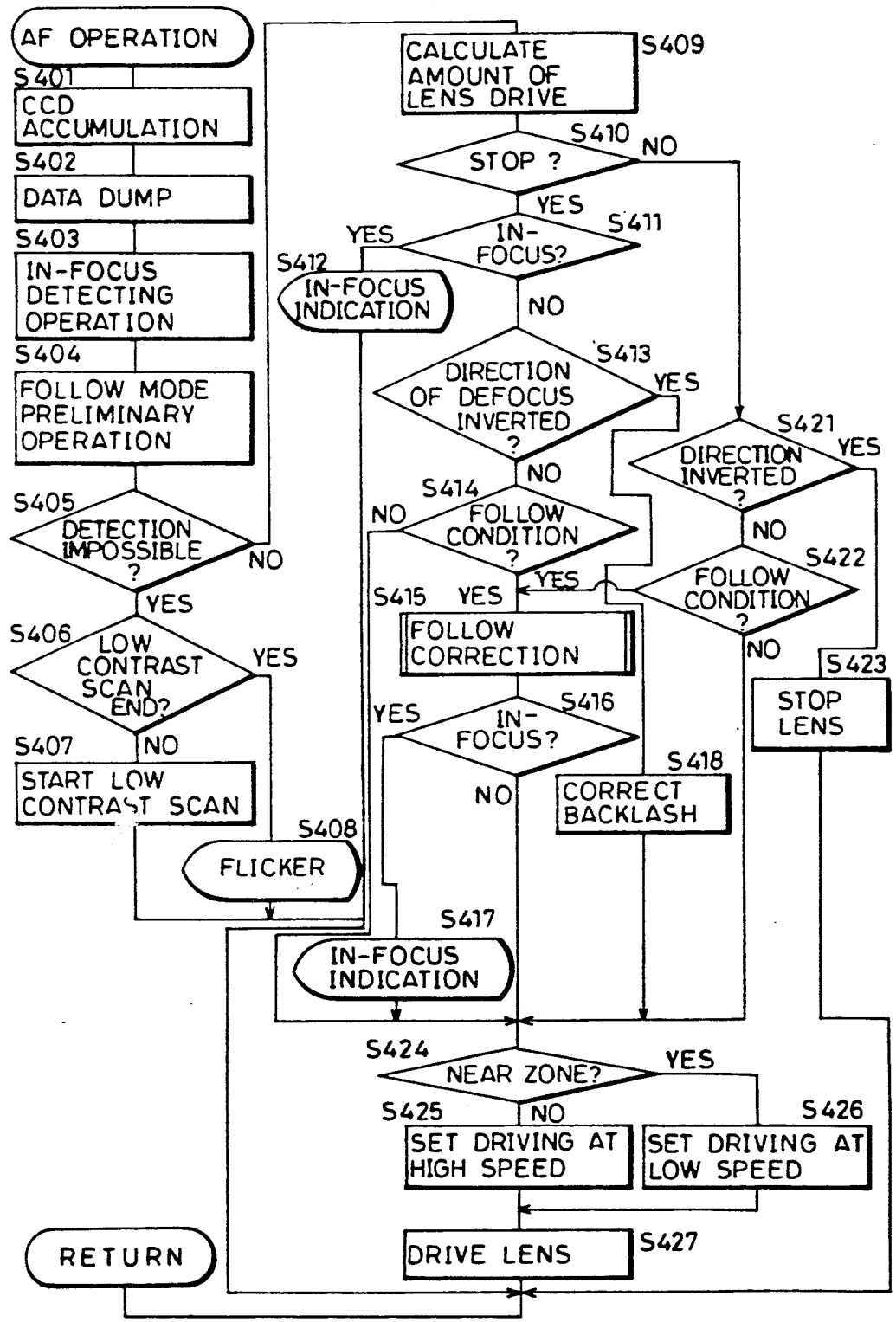
FIG. 4 is a flow chart showing an AF operation subroutine.

FIG. 4 is a flow chart showing a AF operation subroutine in the step S5. Referring to FIG. 4, the AF operation subroutine will be described.

First, in step S401, accumulation of object light is carried out by the CCD image sensor 107 through the interface circuit 108. In the next step S402, data of the object accumulated in the CCD image sensor 107 is taken pixel by pixel (this operation is referred to as data damp), and the data is A/D converted in the interface circuit 108 to be taken to the microcomputer 109. In step S403, operation of in-focus detection is carried out based on the data of the object. Detail description of the optical system to which the object light passes, and of the in-focus detecting operation is not very much related to the present invention, so that it is not given here. The detailed description is shown in, for example, Japanese patent Laying-Open No. 59-126517.

In step S404, preliminary operation for following correction is carried out as will be described later. In step S405, direction and amount of defocus are calculated based on the data from the CCD image sensor 107, and based on the result of calculation, whether or not detection of the amount of defocus is possible is determined. If the object image is very much blurred or the contrast is too low, the program proceeds to step S406 determining that the detection is impossible.

In step S406, if the contrast is low, whether or not a low contrast scanning is completed is determined, in which lens position is moved to repeat distance measurement for scanning a portion of sufficient contrast. If the low contrast scanning is not executed, the low contrast scanning is started in step S407. If the contrast is too low even after the completion of low contrast scanning, the indication circuit 115a is flickered in the step S408, showing that the focus detection is impossible. Then the program returns to the step S6 of FIG. 3.

If it is determined that detection of defocus amount is possible in step S405, the flow proceeds to step S409 in which the amount of lens drive ERR (pulse count value) is calculated based on the calculated amount of defocus DF and the conversion coefficient K for forward movement of the lens, which is one of the lens data taken in the step S3 of FIG. 3, in accordance with the following equation.

$$ERR = DF \times K$$

In step S410, whether or not the lens is stopped is determined. If the lens is stopped, whether or not the lens is in the in-focus state is determined in step S411. If the lens is on the in-focus position, the in-focus indication is given in the indicating circuit 115a in step S412, the program returns to the flow of FIG. 3 and proceeds to step S6. If the lens is not on the in-focus position, the program proceeds to step S413 in which whether the direction of defocus calculated in the execution of the routine at this time is opposite to the direction of defocus calculated in the preceding execution of the routine is determined. If the direction of defocus is inverted, the amount of backlash of the lens driving system, which may cause error in inverting lens driving is corrected, and the program proceeds to step S424. If the direction of lens drive is the same, the program proceeds to step S414, in which whether or not an AF driving mode for following correction which will be described later is necessary is determined. If it is determined that the AF driving mode for following correction is necessary, the program proceeds to step S415 in which the amount of lens drive is corrected as the following correction. In step S416, in-focus determination of the following mode is carried out. If it is determined that the in-focus state is realized, the program proceeds to step 417 to indicate that the lens is on in-focus position, and the program further proceeds to step S424.

If the lens is being driven in step S410, the program proceeds to step S421, in which the direction of defocus calculated this time including the correction of step S415 is compared with the direction of defocus till the last time. If it is determined that the direction is inverted, driving of the lens is stopped in step S423 and the program returns. The driving of the lens is stopped here, since if the distance measuring operation is continued with the lens being driven regardless of the inversion of defocus direction, reliability of the distance measurement is degraded. If the direction of defocus is not inverted, the program proceeds to step S422 in which whether or not following correction as in the step S414 is necessary is determined. If following correction is necessary, the program proceeds to step S415. Otherwise the program proceeds to step S424.

In step S424, whether or not the lens is near the in-focus position is determined based on the calculated amount of defocus. If the lens is not near the in-focus position, the program proceeds to step S425 in which the lens is set to be driven at high speed. If the lens is near the in-focus position, the program proceeds to step S426 in which the lens is set to be driven at low speed. In step S427, the lens is driven at the set speed, and then the program returns to step S6 to carry out the focusing operation.

Figure 5:
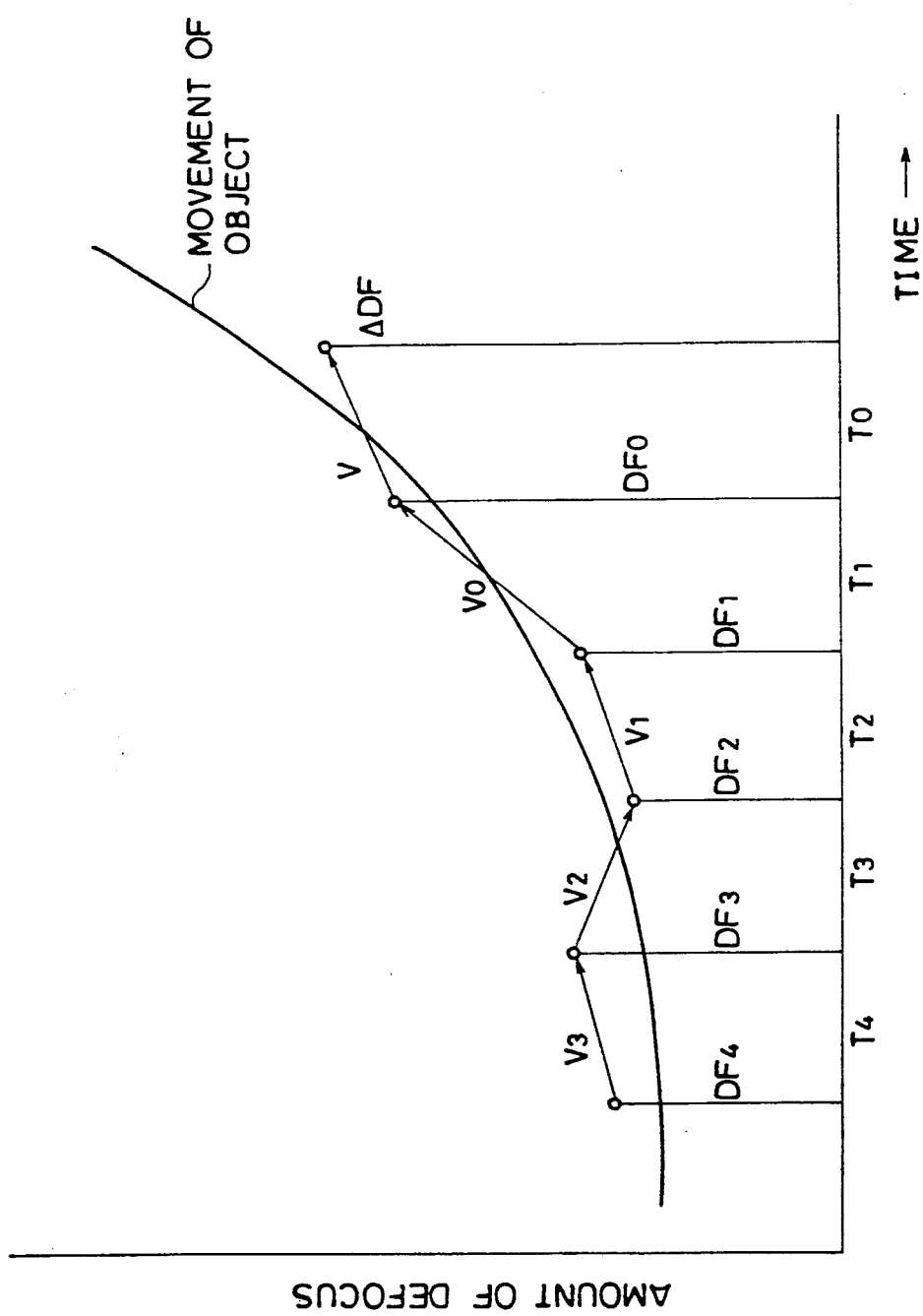
FIG. 5 is a timing chart of a conventional following correction.

The following correction by linear function in the prior art will be described. FIG. 5 shows the timings of following correction. In the figure, the X axis represents time, and Y axis represents the amount of defocus Referring FIG. 5, the reference character $DF_0$ represents the latest amount of defocus with a prescribed lens position being a reference. $DF_1$ represents the amount of defocus of the last operation with the prescribed lens position being the reference. Similarly, reference characters $DF_2$, $DF_3$ ... represents amounts of defocus of the second last, third last operations with the prescribed lens position being the reference. $T_0$ represents time from the end of calculation of the latest defocus $DF_0$ to the end of calculation of defocus of the next time. $T_1$ represents time from the end of calculation of the previous defocus amount $DF_1$ to the end of calculation of the latest defocus amount $DF_0$. Similarly, $T_2$, $T_3$ ... represent time from the end of calculation of $DF_2$ till the end of calculation of $DF_1$, time from the end of calculation of $DF_3$ to the end of calculation of $DF_2$, .... Reference characters $V_0$, $V_1$, $V_2$, $V_3$, ... represent image plane speed, that is, an amount of change of the image forming position per unit time or an amount of change of the defocus amount per unit time, and the reference character $V$ represents mean speed ($V=(V_0+V_1+V_2+V_3)/4$) necessary for calculating the amount of following defocus correction $\Delta DF$. The amount $\Delta DF$ is provided by $V \cdot T_0$, and the lens is driven based on this value.

CCD accumulation, data dump, calculation of the DF amount and the driving of the lens are carried out in each of the time periods $T_0$, $T_1$ ....

Figure 6:
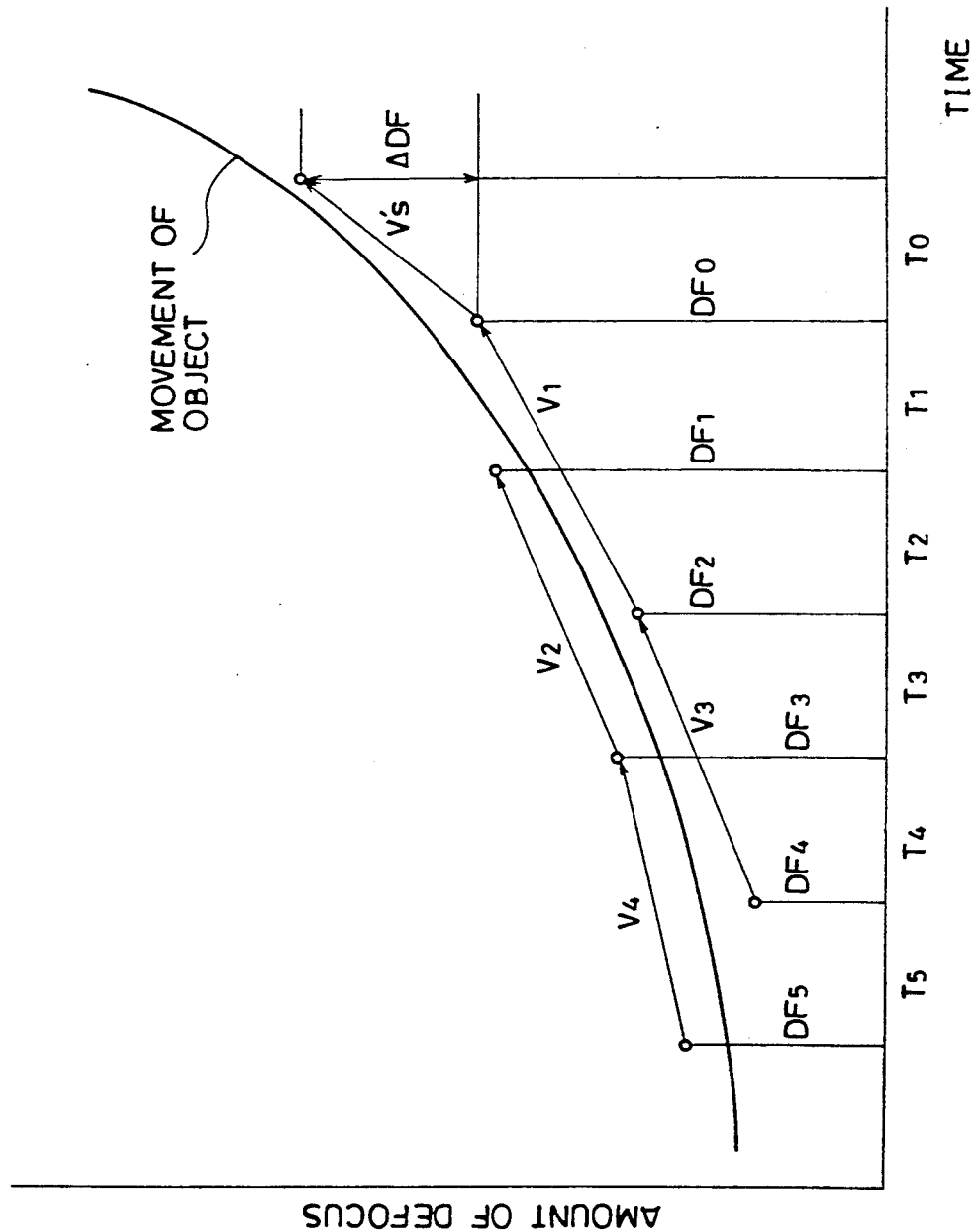
FIG. 6 is a timing chart of the following correction in accordance with the present invention.

The following correction in accordance with the present invention will be described. FIG. 6 is a timing chart of the following correction in accordance with the present invention, and FIG. 7 is a flow chart showing a following correction subroutine shown in step S415 of FIG. 4.

Referring to FIG. 6, the X axis represents time, and Y axis represents the amount of defocus, as in FIG. 5. The reference character $DF_0$ represents the latest amount of defocus with a prescribed lens position being a reference, and $DF_1$ represents the amount of defocus of the last operation with the prescribed lens position being the reference. Similarly, reference characters $DF_2$, $DF_3$, $DF_4$ ... represent amounts of defocus of the second last, third last, fourth last, ... operations with the prescribed lens position being the reference. $T_0$ represents time from the end of calculation of the latest amount of defocus $DF_0$ to the end of the next calculation of the amount of defocus. $T_1$ represents time from the end of the last calculation of the defocus amount $DF_1$ till the end of the latest amount of defocus $DF_0$, and $T_2$, $T_3$, $T_4$, ... respectively represent the time from the end of calculation of $DF_2$ to the end of calculation of $DF_1$, from the end of calculation of $DF_3$ to the end of calculation of $DF_2$, from the end of calculation of $DF_4$ to the end of calculation of $DF_3$, .... $V_1$, $V_2$, $V_3$ and $V_4$ represent the image plane speed. The speed of defocus $V_1$, $V_2$ ... is calculated in every two operations. Namely, $V_4$ is calculated based on $DF_3$ and $DF_5$, skipping $DF_4$. The speed of defocus $V_s'$ is a corrected weighted mean speed of defocus which will be described later, provided based on $V_1$, $V_2$ and $V_3$. The focus correcting amount $\Delta DF$ is provided by the weighted mean speed and the time $T_0$.

Figure 7:
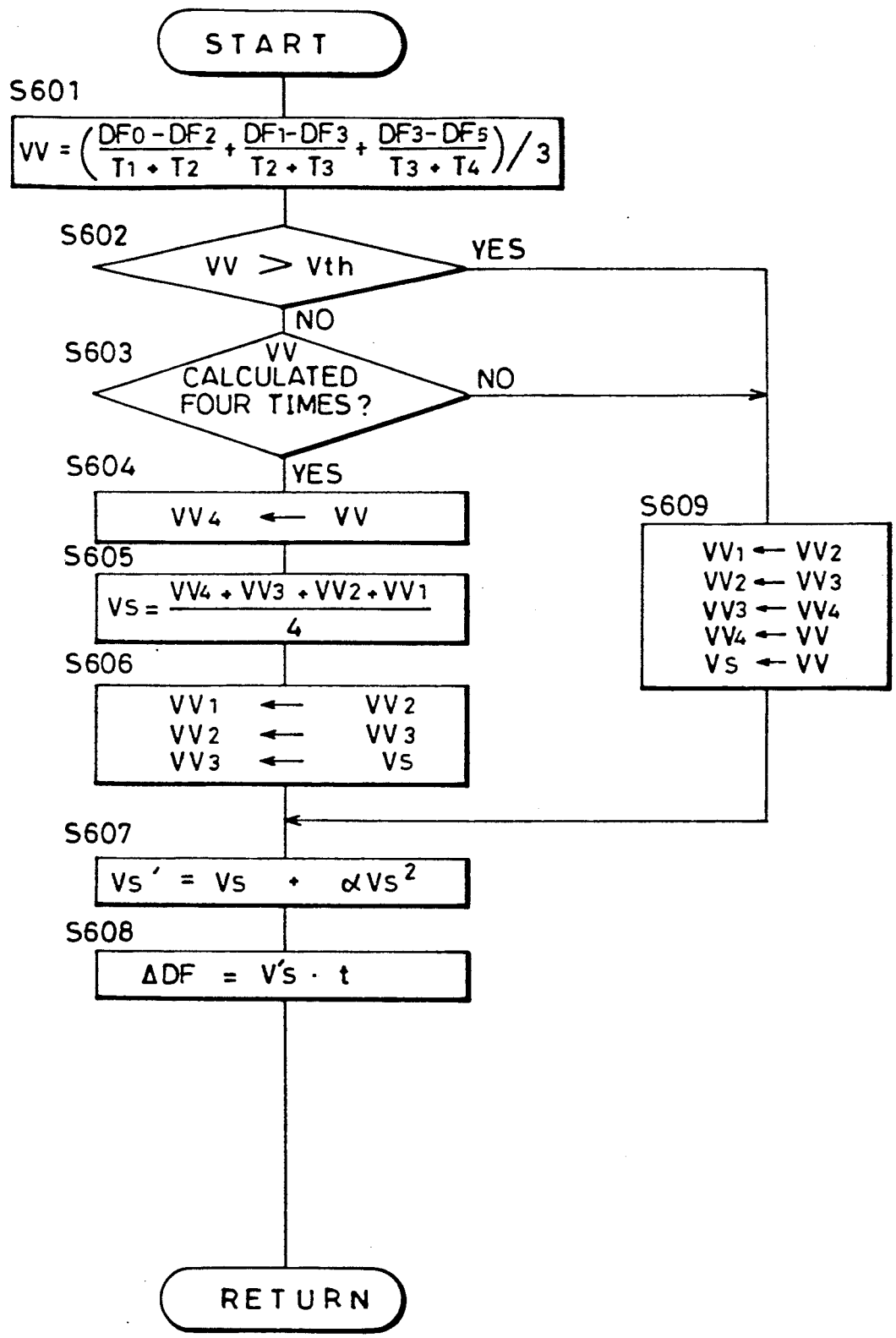
FIG. 7 is a flow chart showing a following correction subroutine in accordance with the present invention.

Referring to FIG. 7, the flow of following correction subroutine in accordance with the present invention will be described. In step S601, object speed VV on the film surface is calculated in accordance with the following equation.

$$VV = \left( \frac{DF_0 - DF_2}{T_1 + T_2} + \frac{DF_1 - DF_3}{T_2 + T_3} + \frac{DF_3 - DF_5}{T_3 + T_4} \right)/3$$

This will be hereinafter referred to as a simple mean value. In the next step S602, the calculated value VV is compared with a predetermined speed $V_{TH}$. If the calculated value is lower than the predetermined speed, the flow following the step S603 is executed, and if the speed is higher, the flow following the step S609 is executed. If the mean speed VV of the object on the film surface is smaller than the predetermined speed $V_{TH}$ in the step S602, there is much time to spare, and therefore correction of the object speed is carried out by using a secondary curve approximation. In step S603, whether or not 4 or more simple mean values of the object speed on the film surface has been calculated is determined. If the number of simple mean values calculated is smaller than 4, the weighted mean processing, which will be described later, cannot be carried out. Therefore, the program proceeds to the flow following the step S609. If the number is four or more, the flow following the step S604 is carried out. In the following, the flow when the number of calculated simple mean values is four or more will be described first.

In step S604, the mean speed VV is substituted for a variable $VV_4$ for carrying out the weighted mean processing described later. In the next step S605, the means value $V_s$ is calculated by using four latest mean values $VV_1$, $VV_2$, $VV_3$ and $VV_4$ in accordance with the following equation.

$$V_s = \frac{VV_1 + VV_2 + VV_3 + VV_4}{4}$$

This will be hereinafter referred to as the weighted mean. In the next step S606, the mean speed $VV_2$ is substituted for the mean speed $VV_1$, and similarly, $VV_3$ is substituted for $VV_2$. The weighted mean speed $V_s'$ substituted for the mean speed $VV_3$. Then, in step S607, the weighted mean value $V_s'=(V_s+a \cdot V_s^2)$ corrected by the secondary curve approximation is calculated. The reference character $a$ is a correction coefficient, provided by $a=2 \cdot \Delta t/f \cdot \beta$, f is focal length and $\beta$ is photographing magnification. As shown in this flow, the mean speed $VV_2$ is substituted for the mean speed $VV_1$, and $VV_3$ is substituted for $VV_2$. The weighted mean speed $V_s'$ substituted for the mean speed $VV_3$, and by this operation, not only the simple mean speed of the four latest values but also the previous simple mean speed can be incorporated in the following defocus correcting operation, so as to compensate for the fluctuation of focus detection. At this time, more weight is added to the new mean speed. Thus precision in correction can be improved. In the next step S608, the following defocus correcting amount $\Delta DF = V_s' \cdot \Delta t$ is calculated by using the weighted mean speed $V_s'$, provided here.

Weighted mean processing takes much time, since not only the present speed VV but also the previous speeds $VV_1$, $VV_2$ and $VV_3$ are used. Therefore, response delay of speed calculation becomes larger.

If the object speed is high, the movement of the object cannot be followed. Accordingly, weighted mean is not employed when the object moves at high speed.

The flow when the mean speed VV calculated in the step S602 is higher than the predetermined speed $V_{TH}$ will be described. At this time, the step S609 is executed. In the step S609, the simple mean speed is shifted. Namely, the mean speed $VV_2$ is substituted for the mean speed $VV_1$. Similarly, $VV_3$ is substituted for $VV_2$, $VV_4$ is substituted for $VV_3$, and VV is substituted for $VV_4$. For the calculation of following defocus correction in the step S608, the mean speed VV is substituted for $V_s$. Then the steps S607 and S608 described above are executed.

The process when the number of calculated mean speed VV is smaller than 4 in the step S603 will be described. In this case also, the step S609 is executed, since the weighted mean processing cannot be carried out.

Correction of the defocus amount by lens driving during releasing will be described with reference to FIGS. 8 and 9. FIG. 8 shows a flow of a lens driving subroutine during releasing, and FIG. 9 is a timing chart during the subroutine. When the switch $S_2$ is pressed, the flow which is being carried out is stopped and the release routine shown in FIG. 8 is started. When the releasing subroutine is started, time $t_1$ from the end (represented by A in FIG. 9) of the last distance measuring operation to the start of the releasing subroutine is calculated in step S701. In step S702, the image plane speed at the time of releasing is estimated based on $t_1$. In the step S702, the object speed $V_{REL}$ on the film surface at the start of release subroutine, that is, $t_1$ after the end of last distance measuring operation is estimated in accordance with the following equation $$V_{REL} = V_s + a \cdot V_s^2$$

of the secondary curve approximation, using the object mean speed $V_s$ (weighted mean) on the film surface at the end of last distance measuring operation (A in FIG. 9). In the step S703, the object speed $V_{REL1}$ on the film surface at the start of traveling of shutter front curtain (represented C in FIG. 9) after $t_2$ from the predetermined time (B in FIG. 9) of start of release subroutine is estimated by the secondary curve approximation, by using the object speed $V_{REL}$ on the film surface at the time (B in FIG. 9) of the start of the release subroutine.

The correction of the amount of lens driving during releasing, that is, $\Delta DF_2 = V_{REL} \cdot t_1 + V_{REL1} \cdot t_2$ is calculated by using the estimated object speed $V_{REL}$ and $V_{REL1}$ on the film surface and the times $t_1$ and $t_2$. The sum of the corrected amount of lens driving during releasing $\Delta DF_2$ and the amount of defocus at present $\Delta DF_1$, that is, $\Delta DF_1 + \Delta DF_2$ is the amount of correction of defocus which must be corrected after the start of releasing subroutine (S705). Then the normal releasing process is carried out.

In FIG. 9, data of following correction (linear function correction) is also shown as $\Delta DF2'$. Compared with the linear function correction, the correction of the present invention follows better the change in defocus of the object.

FIG. 10 shows examples of correction of defocus speed in accordance with the conventional method and correction using the secondary curve approximation. Here, the X axis represents time, and Y axis represents the amount of defocus from the infinite position. (1) and (3) are examples of correction in accordance with the conventional linear function, and (2) and (4) are examples of correction in accordance with the secondary curve approximation of the present invention. (1) and (2) on the left side are examples when the object moves at low speed, and (3) and (4) on the right side are examples when the object moves at high speed. In the figure, the solid lines represent movement of the object. The dotted lines are data following the object while carrying out defocus speed correction. Variations in the Y axis direction represent variations of defocus from the infinite position, including variations of the lens positions due to the correction driving.

From the comparison between (1) and (3) and (2) and (4) in FIG. 10, correction following the actual movement of the object can be realized regardless of the speed of movement of the object by the secondary function approximation in accordance with the present invention compared with the conventional linear function approximation.

Further, from the comparison between (1), (2) and (3), (4), conventionally, the amount of correction follows the actual movement of the object when the speed of the object is low. However, conventionally, the correction cannot follow the movement when the object moves at high speed. However, in the present invention, the corrected value follows the movement of object in both the low speed and high speed regions.

In the embodiment of the present invention, the equations for calculating the amount of correction of the image speed is changed dependent on whether the speed of movement of the object is higher than a prescribed speed. The equations for correction calculations may be selected stepwise dependent on the speed of movement of the object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focus adjusting apparatus of a camera, comprising:
   defocus amount calculating means for calculating amount of defocus of an object;
   image plane speed calculating means for calculating repeatedly image plane speed of said object based on the amount of defocus calculated by said defocus amount calculating means;

image plane speed estimating means for estimating image plane speed of said object at the time of exposure by using an approximation function of high degree, based on said image plane speeds at the start of releasing; and lens position calculating means for calculating lens position based on said estimated image plane speed.

2. An automatic focus adjusting apparatus of a camera according to claim 1, wherein said image plane speed estimating means includes means for calculating mean value of a plurality of image plane speeds, for estimation based on the mean value.

3. An automatic focus adjusting apparatus of a camera according to claim 2, wherein said mean value calculating means calculates the mean value by weighting new image plane speed.

* * * * *